United States Patent Office 3,661,912
Patented May 9, 1972

3,661,912
BIS(N-ACYLAMINO) DERIVATIVES OF PERYLENE TETRACARBOXYLIC ACID IMIDES
Dietmar Kalz, Leverkusen, and Gerhard Wolfrum, Opladen, Germany, assignors to Farbenfabriken Bayer Aktiengesellschaft, Leverkusen, Germany
No Drawing. Filed Aug. 26, 1968, Ser. No. 755,438
Claims priority, application Germany, Aug. 31, 1967, P 15 69 754.8, P 15 69 755.9, P 15 69 756.0; Oct. 10, 1967, F 53,721, F 53,722, F 53,723; Oct. 24, 1967, P 16 69 760.6
Int. Cl. C07d 39/00
U.S. Cl. 260—281           7 Claims

ABSTRACT OF THE DISCLOSURE

A perpylene series dyestuff of the formula:

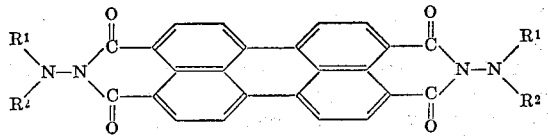

wherein:
$R^1$ is hydrogen, an optionally substituted alkyl, cycloalkyl, aralkyl, or aryl group;
$R^2$ is a optionally substituted alkyl, cycloalkyl, aralkyl or aryl group, or an alkoxy carbonyl group, or a heterocyclic radical;
or a radical of the formula:
wherein
X is $$-X-R^3$$

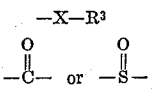

and $R^3$ is an optionally substituted alkyl, cycloalkyl, aralkyl, aryl or heterocyclic radical;
or a radical of the formula:

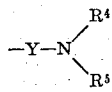

wherein
Y is

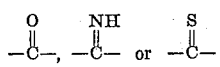

and $R^4$ and $R^5$ are hydrogen or optionally substituted alkyl groups, cycloalkyl groups, aralkyl groups or aryl groups;
wherein the perylene radical can have further substituents; with the proviso that when $R^2$ is

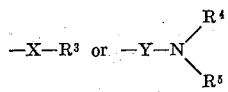

then $R^1$ is hydrogen.

---

This invention relates to perylene series dyestuffs of Formula I:

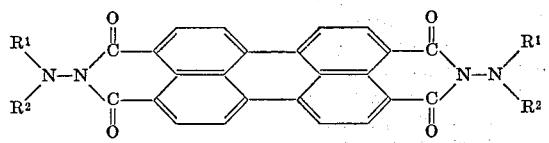

wherein:
$R^1$ is preferably hydrogen but can also be an optionally substituted alkyl, cycloalkyl, aralkyl, or aryl group;
$R^2$ is an optionally substituted alkyl, cycloalkyl, aralkyl or aryl group, or an alkoxy carbonyl group, or a heterocyclic radical;
or a radical of the formula:

$$-X-R^3$$

wherein
X is

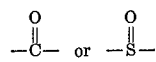

and $R^3$ is an optionally substituted alkyl, cycloalkyl, aralkyl, aryl or heterocyclic radical;
or a radical of the formula:

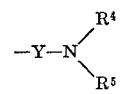

wherein Y is

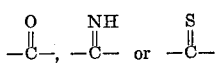

and $R^4$ and $R^5$ are hydrogen or optionally substituted alkyl groups, cycloalkyl groups, aralkyl groups or aryl groups;
wherein the perylene radical can have further substituents; with the proviso that when $R^2$ is

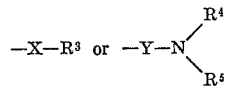

then $R^1$ is hydrogen.

One preferred class of dyestuffs are those of Formula I wherein $R^2$ represents an optionally substituted alkyl, cycloalkyl, aralkyl or an aryl group, or an alkoxycarbonyl group, or a heterocyclic radical, and the perpylene radical may contain further substituents, as well as a process for their production.

As alkyl groups there may particularly be mentioned those which contain 1–4 carbon atoms and may exhibit further substituents, such as hydroxy groups, alkoxy groups, alkoxycarbonyl groups, carboxamido or sulphonamido groups. Alkyl groups of the type mentioned above are, for example, methyl, ethyl, propyl, butyl, methoxyethyl, ethoxyethyl, methoxycarbonylethyl or ethoxycarbonylethyl groups.

As cycloalkyl groups there may be mentioned in particular cyclohexyl and cyclopentyl groups.

As aralkyl groups there may especially be mentioned benzyl groups as well as the benzyl groups which are substituted in the CH$_2$ group by any of the above-mentioned alkyl groups; the phenyl radicals may exhibit further substituents, such as halogen, for example fluorine, chlorine or bromine, nitro groups, hydroxy groups, alkoxy groups, particularly those containing 1–4 carbon atoms, carboxamido groups or sulphonamido groups alkoxycarbonyl groups, especially those containing 1–4 carbon atoms, as well as alkyl groups, especially those containing 1–4 carbon atoms.

As aryl groups there may be mentioned in particular phenyl groups, naphthyl groups as well as radicals of the anthraquinone series, and these radicals may exhibit substituents, such as halogen, for example, fluorine, chlorine or bromine, nitro groups, hydroxy groups, alkoxy groups, especially those containing 1–4 carbon atoms, alkoxycarbonyl groups, particularly those containing 1–4 carbon atoms, carboxamido groups or sulphonamido groups.

As heterocyclic radicals there may be mentioned in particular thiazolyl, benzimidazolyl, benzoxazolyl, benzothiazoyl, sulpholanyl, triazolyl, pyridinyl, quinolinyl, quinoxalinyl, and phthalimido.

A second preferred class of dyestuffs of the present invention are those of Formula II:

(II)
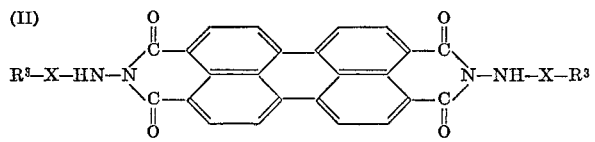

wherein X and R³ have the above described meanings.

The alkyl, cycloalkyl, aralkyl, aryl or heterocyclic radicals R³ may exhibit further substituents, for example, halogen, such as fluorine, chlorine or bromine; nitro groups, hydroxy groups, alkoxy groups, especially those with 1–4 carbon atoms, such as methoxy groups, ethoxy groups or butoxy groups; alkylmercapto groups, especially those with 1–4 carbon atoms, such as methylmercapto groups, ethylmercapto groups or butylmercapto groups, arylmercapto groups, especially the phenylmercapto groups which may contain in the phenyl nucleus further substituents; acyloxy groups, especially those in which the acyl radical contains 1–4 carbon atoms, such as acetoxy groups or propionyloxy groups; alkylcarbonylamino groups, especially those with 1–4 carbon atoms, such as acetylamino groups, propionylamino groups or butyrylamino groups; arylcarbonylamino groups, for example, benzoylamino groups; alkylsulphonylamino groups, for example, methylsulphonylamino groups or butylsulphonylamino groups; arylsulphonylamino groups, especially phenylsulphonylamino groups, such as benzene-sulphonylamino groups or toluene-sulphonylamino groups; carboxamido groups or sulphonamido groups, in which the two last-mentioned groups may exhibit alkyl, cycloalkyl, aralkyl or aryl groups.

Alkyl groups to be particularly mentioned are those with 1–20 carbon atoms, which may contain further substituents, such as hydroxy, alkylcarbonylamino, arylcarbonylamino, aralkylcarbonylamino, alkylsulphonylamino groups, aralkylsulphonylamino groups, arylsulphonylamino groups; alkoxy groups, especially those with 1–4 carbon atoms, such as methoxy groups, ethoxy groups or butoxy groups; aryloxy groups, preferably phenyloxy or naphthyloxy groups in which the aryl radical may exhibit substituents, such as halogen atoms, for example, fluorine, chlorine or bromine, nitro groups, alkyl groups or alkoxy groups; arylthio groups, preferably phenylthio groups or naphthylthio groups in which the aryl radical may exhibit substituents, such as halogen atoms; alkyl groups, especially those with 1–4 carbon atoms; aryl groups, especially phenyl groups which may exhibit substituents, such as halogen atoms, hydroxy groups or alkyl groups.

Cyclohexyl groups and cyclopentyl groups may be particularly mentioned as cycloalkyl groups.

Aryl groups to be especially mentioned are phenyl radicals, naphthyl radicals or anthracene radicals which may exhibit substituents, such as halogen, for example fluorine, chlorine or bromine, nitro groups, alkyl groups, especially those with 1–4 carbon atoms, phenyl groups, nitrophenyl groups, hydroxy groups, alkoxy groups, especially those with 1–4 carbon atoms; alkylcarbonyloxy groups, especially those with 1–4 carbon atoms in the alkyl radical; aryloxycarbonyl groups, especially phenyloxycarbonyl groups in which the phenyl radical may exhibit further substituents; sulphonamido groups or carboxamido groups which may be substituted by alkyl, cycloalkyl, aralkyl or aryl radicals.

Aralkyl groups to be mentioned are especially benzyl groups which may exhibit further substituents in the phenyl radical, and the CH₂ group of which may be substituted by alkyl groups, especially those with 1–4 carbon atoms.

Heterocyclic radicals to be mentioned especially are pyrazolonyl, pyrazinyl, pyridinyl, carbazolyl, quinoxalinyl and, diphenylene-oxido.

A third preferred class of dyestuffs of the present invention are those of Formula III:

III)
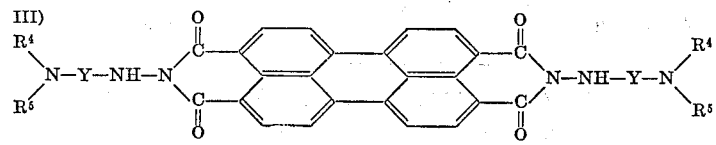

wherein Y, R⁴ and R⁵ have the above described meaning.

As alkyl groups R⁴ and R⁵ there may particularly be mentioned those containing 1–12 carbon atoms, which may exhibit further substituents, such as, alkoxy groups, alkoxycarbonyl groups, carboxamido or sulphonamido groups, alkyl groups of the type mentioned above are, for example, methyl, ethyl, propyl, butyl, methoxyethyl, ethoxyethyl, methoxycarbonylethyl or ethoxycarbonylethyl groups.

As cycloalkyl groups there may be mentioned in particular cyclohexyl and cyclopentyl groups.

As aralkyl groups there may especially be mentioned benzyl groups as well as the benzyl groups which are substituted in the CH₂ group by alkyl groups, and the phenyl radicals may exhibit further substituents, such as halogen, for example, fluorine, chlorine or bromine; nitro groups, alkoxy groups, especially those containing 1–4 carbon atoms; carboxamido groups or sulphonamido groups; alkoxycarbonyl groups, especially those containing 1–4 carbon atoms, as well as alkyl groups, especially those containing 1–4 carbon atoms.

As aryl groups there may particularly be mentioned phenyl groups and naphthyl groups, and these radicals may exhibit substituents, such as halogen, for example, fluorine, chlorine or bromine; nitro groups, alkyl groups, alkoxy groups, especially those containing 1–4 carbon atoms; alkoxycarbonyl groups, especially those containing 1–4 carbon atoms; carboxamido groups or sulphonamido groups.

The production of the new dyestuffs of Formula I is carried out by reacting optionally substituted perylene-3,4,9,10-tetracarboxylic acids or their acid derivatives with compounds of Formula IV:

(IV)
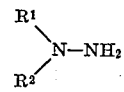

or their salts, in which R¹ and R² have the above meaning, in a molar ratio of about 1:2.

Suitable compounds of Formula II are the following:

β-cyanoethylhydrazine,
β-hydroxyethylhydrazine,
hydrazino-carboxylic acid ethyl ester,
1,1-dimethylhydrazine,
2-chloro-phenylhydrazine,
3-chloro-phenylhydrazine,
4-chloro-phenylhydrazine,
2,4-dichloro-phenylhydrazine,
2,5-dichloro-phenylhydrazine,
2,6-dichloro-phenylhydrazine,
2-nitro-phenylhydrazine, 3-nitro-phenylhydrazine,
2,4-dinitro-phenylhydrazine,
2-chloro-4-nitro-phenylhydrazine,
4-chloro-3-nitro-phenylhydrazine,
o-tolylhydrazine,
m-tolylhydrazine,
p-tolylhydrazine,
2-methoxy-phenylhydrazine,
3-methoxy-phenylhydrazine,
4-methoxy-phenylhydrazine,
2-methoxy-5-methyl-phenylhydrazine,
4-hydrazino-benzoic acid amide,
3-hydrazino-benzene-sulphonic acid,
4-hydrazino-benzene-sulphonic acid amide,
1-hydrazino-anthraquinone,
2-hydrazino-thiazole,
4-methyl-2-hydrazino-thiazole,
4-phenyl-2-hydrazino-thiazole,
4,5-dimethyl-2-hydrazino-thiazole,
2-hydrazino-benzimidazole,
2-hydrazino-5-sulphonamido-benzimidazole,
2-hydrazinobenzoxazole,
2-hydrazinobenzothiazole,
6-carboxamido-2-hydrazino-benzothiazole,
6-ethoxy-2-hydrazino-benzothiazole,
3-hydrazino-sulpholan,
3-hydrazino-1,2,4-triazole,
2-hydrazino-pyridine,
2-hydrazino-quinoline,
2-hydrazino-4-methyl-quinoline,
2-hydrazino-pyrimidine,
2-hydrazino-quinoxaline,
4-hydrazino-phthalimide,
4-hydrazino-phthalic acid-N-methylimide, and mixtures thereof.

The preferred dyestuffs of Formula III are produced when the compound of Formula IV is that of Formula V:

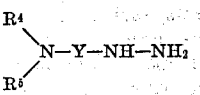

wherein Y, $R^4$ and $R^5$ have the above described meanings; or salts thereof.

Suitable compounds of Formula V are semicarbazide, aminoguanidine, thiosemicarbazide and their substitution products, for example, 4-methylsemicarbazide,
4-ethylsemicarbazide,
4-butylsemicarbazide,
4-phenylsemicarbazide,
4-(4'-chlorophenyl)-semicarbazide,
4-(3'-bromophenyl)-semicarbazide,
4-(4'-carboxamidophenyl)-semicarbazide,
4-(4'-nitrophenyl)-semicarbazide,
4-benzylsemicarbazide,
4-cyclohexyl-semicarbazide,
4-cyclopentylsemicarbazide,
4,4-dimethylsemicarbazide,
4,4-methyl-ethyl-semicarbazide,
4,4-methyl-phenyl-semicarbazide,
4,4-methyl-benzyl-semicarbazide,
4-methyl-thiosemicarbazide,
4-ethyl-thiosemicarbazide,
4-butyl-thiosemicarbazide,
4-phenyl-thiosemicarbazide,
4-(4'-chlorophenyl)-thiosemicarbazide,
4-(3'-bromophenyl)-thiosemicarbazide,
4-(4'-carboxamido-phenyl)-thiosemicarbazide,
4-(4'-nitrophenyl)-thiosemicarbazide,
4-benzyl-thiosemicarbazide,
4-cyclohexyl-thiosemicarbazide,
4-cyclopentyl-thiosemicarbazide,
4,4-dimethyl-thiosemicarbazide,
4,4-methyl-ethyl-thiosemicarbazide,
4,4-methyl-phenyl-thiosemicarbazide,
4,4-methyl-benzyl-thiosemicarbazide,
N-amino-N'-methyl-guanidine,
N-amino-N'-ethyl-guanidine,
N-amino-N'-butyl-guanidine,
N-amino-N'-phenyl-guanidine,
N-amino-N'-(4-chlorophenyl)-guanidine,
N-amino-N'-(3-bromophenyl)-guanidine,
N-amino-N'-(4-carboxamido-phenyl)-guanidine,
N-amino-N'-4-nitrophenyl)-guanidine,
N-amino-N'-benzyl-guanidine,
N-amino-N'-cyclohexyl-guanidine,
N-amino-N'-cyclopentyl-guanidine,
N-amino-N',N''-dimethyl-guanidine,
N-amino-N'-methyl-N''-ethyl-guanidine,
N-amino-N'-methyl-N''-phenyl-guanidine,
N-amino-N',N''-diphenyl-guanidine,
N-amino-N'-methyl-N''-benzyl-guanidine, salts thereof, and mixtures thereof.

The preferred dyestuffs of Formula II are produced when the compound of Formula IV is that of Formula VI:

(VI) 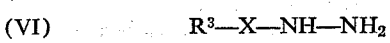 $R^3$—X—NH—NH$_2$ wherein X and $R^3$ have the above described meanings; or salts thereof.

Suitable compounds of Formula VI are, for example, propionic acid-,
dodecanoic acid-,
tetradecanoic acid-,
hexadecanoic acid-,
octadecanoic acid-,
DL-lactic acid-,
6-acetylamino-hexanoic acid-,
1-acetylamino-undecanoic acid,
phenoxy acetic acid-,
2-chloro-phenoxy-acetic acid-,
2,4-dichloro-phenoxy-acetic acid-,
2,4,5-trichloro-phenoxy-acetic acid-,
2-nitro-phenoxy-acetic acid-,
4-chloro-phenylmercapto-acetic acid-,
4,6-dichloro-3-methyl-phenylmercapto-acetic acid-,
8-chloro-naphthyl-1-mercapto-acetic acid-,
naphthyl-2-mercapto-acetic acid-,
cyclohexane carboxylic acid-,
benzoic acid-,
2-chlorobenzoic acid-,
3-chloro-benzoic acid-,
4-chloro-benzoic acid-,
2,4-dichloro-benzoic acid-,
2,5-dichloro-benzoic acid-,
3,4-dichloro-benzoic acid-,
2-bromo-benzoic acid-,
2-nitrobenzoic acid-,
3-nitrobenzoic acid-,
4-nitrobenzoic acid-,
4-chloro-3-nitro-benzoic acid-,
6-chloro-3-nitro-benzoic acid-,
2-chloro-4-nitro-benzoic acid-,
2,4-dinitro-benzoic acid-,
3,4-dinitro-benzoic acid-,
3,5-dinitro-benzoic acid-,
phenyl acetic acid-,
2-methyl-benzoic acid-,
3-methyl-benzoic acid-,
4-nitro-3-methyl-benzoic acid-,
4-methyl-benzoic acid-,
3-nitro-4-methyl-benzoic acid-,
4-methyl-phenyl-acetic acid-,
naphthalene-carboxylic acid-1-,
naphthalene-carboxylic acid-2-,
biphenyl-carboxylic acid-4-,
4'-nitro-biphenyl-carboxylic acid-4-,
2-hydroxy-benzoic acid-,
2-methoxy-benzoic acid-, 2-acetoxy-benzoic acid-,
5-chloro-2-hydroxy-benzoic acid-,
3-nitro-2-hydroxy-benzoic acid-,
5-nitro-2-hydroxy-benzoic acid-,
3,5-dinitro-2-hydroxy-benzoic acid-,
3-hydroxy-benzoic acid-,
3-methoxy-benzoic acid-,
4-chloro-3-hydroxy-benzoic acid-,
4-hydroxy-benzoic acid-,
4-methoxy-benzoic acid-,
3-chloro-4-hydroxy-benzoic acid-,
3-nitro-4-hydroxy-benzoic acid-,
3-nitro-4-methoxy-benzoic acid-,
3,5-dinitro-4-hydroxy-benzoic acid,
4-ethylmercapto-2-chloro-benzoic acid-,
DL-mandelic acid,
2-hydroxy-3-methyl-benzoic acid-,
5-chloro-2-hydroxy-3-methyl-benzoic acid-,
6-hydroxy-3-methyl-benzoic acid-,
2-hydroxy-4-methyl-benzoic acid-,
2-hydroxy-5-sulphonamido-benzoic acid-,
6-hydroxy-2,4-dimethyl-benzoic acid-,
3-hydroxy-5,6,7,8-tetrahydronaphthalene-carboxylic acid-2-,
2-hydroxy-naphthalene-carboxylic acid-1-,
1-hydroxy-naphthalene-carboxylic acid-2-,
3-hydroxy-naphthalene-carboxylic acid-2-,
6-hydroxy-naphthalene-carboxylic acid-2-,
3-hydroxy-7-sulphonamido-naphthoic acid-2-,
benzilic acid-,
3-hydroxy-anthracene-carboxylic acid-2-,
2-hydroxy-3-methoxy-benzoic acid-,
2,4-dihydroxy-benzoic acid-,
3,5-dihydroxy-benzoic acid-,
3,5-dihydroxy-naphthalene-carboxylic acid-2-,
4,4'-dihydroxy-biphenyl-carboxylic acid-2-,
4,4-bis-(4-hydroxy-phenyl)-valeric acid-,
gallic acid-,
anthraquinone-carboxylic acid-2-,
1-chloro-anthraquinone-carboxylic acid-2-,
3-chloro-anthraquinone-carboxylic acid-2-,
1-nitro-anthraquinone-carboxylic acid-2-,
4-sulphonamido-benzoic acid-,
(4-N,N-dimethyl-sulphonamido)-benzoic acid-,
1-acetylamino-naphthoxy-acetic acid-2-,
3-hydroxy-diphenyenoxide-carboxylic acid-2-,
nicotinic acid-,
isonicotinic acid-, pyrazine-carboxylic acid-,
quinoxaline-carboxylic acid-(2)-,
2-hydroxy-carbazole-carboxylic acid-3-,
2-hydroxy-3-carboxy-11H-benzocarbazole-,
1-phenyl-pyrazolone-5-carboxylic acid-3-,
1-(3-nitro-phenyl)-pyrazolone-5-carboxylic acid-3-,
1-(4-nitro-phenyl)-pyrazolone-5-carboxylic acid-3-hydrazide-,
2-hydroxyethane-sulphonic acid-,
benzene-sulphonic acid-,
2-chloro-benzene-sulphonic acid-,
3-chloro-benzene-sulphonic acid-,
4-chloro-benzene-sulphonic acid-,
2,5-dichloro-benzene-sulphonic acid-,
3,4-dichloro-benzene-sulphonic acid-,
4-chloro-3-nitro-benzene-sulphonic acid-,
6-chloro-3-nitro-benzene-sulphonic acid-,
toluene-sulphonic acid-2-,
4-chloro-toluene-sulphonic acid-2-,
4-nitro-toluene-sulphonic acid-2-,
5-bromo-toluene-sulphonic acid-3-,
toluene-sulphonic acid-4-,
4-acetylamino-benzene-sulphonic acid-,
2-chloro-toluene-sulphonic acid-4-,
2-nitro-toluene-sulphonic acid-4-,
2,6-dinitro-toluene-sulphonic acid-4-,
1,3-dimethyl-benzene-sulphonic acid-4-,
1-hydroxy-benzene-sulphonic acid-2-,
1-hydroxy-benzene-sulphonic acid-3-,
1-hydroxy-benzene-sulphonic acid-4-,
2,6-dichloro-phenol-sulphonic acid-4-,
2-nitrophenol-sulphonic acid-4-,
2-nitro-anisole-sulphonic acid-4-hydrazide,
and mixtures thereof.

Perylene compounds which can be reacted with compounds of Formulae IV, V and VI include perylene tetracarboxylic acids, and acid derivatives. Acid derivatives particularly include acid anhydrides, acid chlorides and esters. It is self-evident that also those perylene derivatives may be used which simultaneously exhibit carboxylic acid groups and functional derivatives of carboxylic groups, for example, anhydride groups, ester groups or acid chloride groups.

The nucleus of the perylene compound is preferably unsubstituted but can also be substituted with 1 to 8, preferably 1 to 4, non-interfering substituents, examples of which include, among others, halogen atoms, such as fluorine, chlorine or bromine; nitro groups, hydroxyl groups, as well as lower alkoxy groups, especially those containing 1–4 carbon atoms, such as methoxy groups, ethoxy groups or butoxy groups.

Perylene compounds suitable for the production of the dyestuffs of Formula I are, for example, perylene-3,4,9,10-tetracarboxylic acid and perylene-3,4,9,10-tetracarboxylic dianhydride, as well as dichloro-perylene-3,4,9,10-tetracarboxylic acid, tetrachloro-perylene - 3,4,9,10-tetracarboxylic acid, dichloro-perylene - 3,4,9,10-tetracarboxylic dianhydride, tetrachloro-perylene-3,4,9,10-tetracarboxylic dianhydride, dimethoxy-perylene-3,4,9,10-tetracarboxylic dianhydride and dimethoxy-perylene - 3,4,9,10 - tetracarboxylic acid, and mixtures thereof.

The reaction is carried out at normal or increased pressure by heating the perylene compound with compounds of Formula IV to temperatures of 100–300° C., preferably to 150–240° C., optionally in the presence of solvents and/or diluents, such as chlorinated hydrocarbons, for example, chlorobenzene, dichlorobenzene, trichlorobenzene; chlorotoluenes, chloronaphthalenes or higher boiling heterocyclic bases, such as quinoline or pyridine. An addition of acidic condensing agents is an advantage, such as zinc or cadmium salts, for example, zinc chloride, zinc bromide or zinc acetate; and the corresponding cadmium salts, as well as hydrochloric acid, sulphuric acid, phosphoric acid or polyphosphoric acid.

Another process for preparing the dyestuffs of Formula VI comprises reacting N,N'-perylene-tetracarboxylic acid diamino-diamides which may be substituted in the perylene radical and correspond to Formula VII:

(VII)
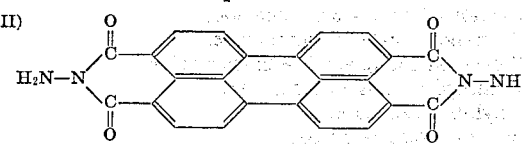

in a molar ratio of about 1:2 with carboxylic acids or their acid derivatives of Formula VIII:

(VIII)     

in which Z stands for OH, halogen or for an alkoxy group, and/or with sulphonic acid halides of Formula IX:

(IX)     

in which Hal stands for F, Cl or Br, and $R^3$ has the same meaning as above.

It is not necessary for this purpose to use the carboxylic acid or sulphonic acid derivatives, for example, the halides, in substance, but they can be prepared during or before the acylation reaction in the same reaction vessel and reaction medium.

The alkyl, cycloalkyl, aralkyl, aryl or heterocyclic radicals $R^3$ can contain further substituents. An exception, obviously, are those substituents which react with the functional groups of the compounds of Formulae VIII and IX under the reaction conditions of the process according to this invention.

It is self-evident that mixtures of optionally substituted N,N'-perylene-tetracarboxylic acid-diamino-diimides, as well as mixtures of various compounds of Formula VIII and/or Formula IX, can also be used for the reaction. Dependent upon the type of the starting compounds used, symmetric or asymmetric dyestuffs of Formula I or mixtures of symmetric with asymmetric dyestuffs are thus obtained.

Perylene compounds of Formula VII suitable for the production of the dyestuffs of Formula I are, for example, N,N'-perylene-tetracarboxylic acid - diamino - diimide, dichloroperylene-3,4,9,10 - tetracarboxylic acid-N,N'-diamino-diimide, tetrachloroperylene - 3,4,9,10 - tetracarboxylic acid-N,N'-diamino-diimide.

Suitable compounds of Formula VIII are, for example, propionic acid,
dodecanoic acid,
tetradecanoic acid,
hexadecanoic acid,
octadecanoic acid,
DL-lactic acid,
6-acetylamino-hexanoic acid,
11-acetylamino-undecanoic acid,
phenoxy acetic acid,
2-chloro-phenoxy-acetic acid,
2,4-dichloro-phenoxy-acetic acid,
2,4,5-trichloro-phenoxyacetic acid,
2-nitro-phenoxy-acetic acid,
4-chloro-phenylmercapto-acetic acid,
4,6-dichloro-3-methyl-phenylmercaptoacetic acid,
8-chloro-naphthyl-1-mercapto-acetic acid,
naphthyl-2-mercapto-acetic acid,
cyclohexane carboxylic acid,
benzoic acid,
2-chloro-benzoic acid,
3-chloro-benzoic acid,
4-chloro-benzoic acid,
2,4-dichloro-benzoic acid,
2,5-dichloro-benzoic acid,
3,4-dichloro-benzoic acid,
2-bromo-benzoic acid,
2-nitro-benzoic acid,
3-nitro-benzoic acid,
4-nitro-benzoic acid,
4-chloro-3-nitro-benzoic acid,
6-chloro-3-nitro-benzoic acid,
2-chloro-4-nitro-benzoic acid,
2,4-dinitro-benzoic acid,
3,4-dinitro-benzoic acid,
3,5-dinitro-benzoic acid,
phenyl-acetic acid,
2-methyl-benzoic acid,
3-methyl-benzoic acid,
4-nitro-3-methyl-benzoic acid,
4-methyl-benzoic acid,
3-nitro-4-methyl-benzoic acid,
4-methyl-phenyl acetic acid,
naphthalene-carboxylic acid-1,
naphthalene-carboxylic acid-2,
biphenyl-carboxylic acid-4,
4'-nitro-biphenyl-carboxylic acid-4,
2-hydroxy-benzoic acid,
2-methoxy-benzoic acid,
2-acetoxy-benzoic acid,
5-chloro-2-hydroxy-benzoic acid,
3-nitro-2-hydroxy-benzoic acid,
5-nitro-2-hydroxy-benzoic acid,
3,5-dinitro-2-hydroxy-benzoic acid,
3-hydroxy-benzoic acid,
3-methoxy-benzoic acid,
4-chloro-3-hydroxy-benzoic acid,
4-hydroxy-benzoic acid,
4-methoxy-benzoic acid,
3-chloro-4-hydroxy-benzoic acid,
3-nitro-4-hydroxy-benzoic acid,
3-nitro-4-methoxy-benzoic acid,
3,5-dinitro-4-hydroxy-benzoic acid,
4-ethylmercapto-2-chloro-benzoic acid,
DL-mandelic acid,
2-hydroxy-3-methyl-benzoic acid,
5-chloro-2-hydroxy-3-methyl-benzoic acid,
6-hydroxy-3-methyl-benzoic acid,
2-hydroxy-4-methyl-benzoic acid,
2-hydroxy-5-sulphonamido-benzoic acid,
6-hydroxy-2,4-dimethyl-benzoic acid,
3-hydroxy-5,6,7,8-tetrahydronaphthalene-carboxylic acid,
2-hydroxy-naphthalene-carboxylic acid-1,
1-hydroxy-naphthalene-carboxylic acid-2,
3-hydroxy-naphthalene-carboxylic acid-2,
6-hydroxy-naphthalene-carboxylic acid-2,
3-hydroxy-7-sulphonamido-naphthoic acid-2,
benzilic acid,
3-hydroxyanthracene-carboxylic acid-2,
2-hydroxy-3-methoxy-benzoic acid,
2,4-dihydroxy-benzoic acid,
3,5-dihydroxy-benzoic acid,
3,5-dihydroxy-naphthalene-carboxylic acid-2,
4,4'-dihydroxy-biphenyl-carboxylic acid-2,
4,4-bis(4-hydroxyphenyl)-valeric acid,
gallic acid,
anthraquinone-carboxylic acid-2,
1-chloro-anthraquinone-carboxylic acid-2,
3-chloro-anthraquinone-carboxylic acid,
1-nitro-anthraquinone-carboxylic acid-2,
4-sulphonamido-benzoic acid,
(4-N,N-dimethyl-sulphonamido)-benzoic acid,
1-acetylamino-naphthoxy-acetic acid-2,
3-hydroxy-diphenylene-oxide-carboxylic acid-2,
nicotinic acid,
isonicotinic acid,
pyrazine-carboxylic acid,
quinoxaline-carboxylic acid-2,
2,3-dihydroxy-quinoxaline-carboxylic acid-5,
2-hydroxy-carbazole-carboxylic acid-3,
2-hydroxy-3-carboxy-11H-benzocarbazole,
1-phenylpyrazolone-5-carboxylic acid-3,
1-(3-nitro-phenyl)-pyrazolone-5-carboxylic acid-3,
1-(4-nitrophenyl)-pyrazolone-5-carboxylic acid-3.

The carboxylic acid chlorides of the afore-mentioned acids and their esters, particularly the methyl and ethyl esters, are also suitable.

Suitable compounds of the Formula IX are, for example, 2-hydroxyethane-sulphonic acid,
benzene sulphonic acid,
2-chlorobenzene-sulphonic acid,
3-chlorobenzene-sulphonic acid,
4-chlorobenzene-sulphonic acid,
2,5-dichloro-benzene-sulphonic acid,
3,4-dichloro-benzene-sulphonic acid,
4-chloro-3-nitro-benzene-sulphonic acid,
6-chloro-3-nitro-benzene-sulphonic acid,
toluene-sulphonic acid-2,
4-chloro-toluene-sulphonic acid-2,
4-nitro-toluene-sulphonic acid-2,
5-bromo-toluene-sulphonic acid-3,
toluene-sulphonic acid-4,
4-acetylamino-benzene-sulphonic acid,
2-chloro-toluene-sulphonic acid-4,
2-nitro-toluene-sulphonic acid-4,
2,6-dinitro-toluene-sulphonic acid-4,
1,3-dimethyl-benzene-sulphonic acid-4,
1-hydroxy-benzene-sulphonic acid-4,
2,6-dichloro-phenyl-sulphonic acid-3,
2,6-dichloro-phenol-sulphonic acid-4,
2-nitrophenol-sulphonic acid-4,
2-nitro-anisole-sulphonic acid-4-chloride as well as the corresponding acid bromides and acid fluorides.

The reaction of the N,N'-perylene-3,4,9,10-tetra-carboxylic acid diamino-diimides VII with compounds of the Formulae VIII and IX is carried out at normal or increased pressure by heating the components VII with the components VIII and/or IX, preferably in a molar ratio 1:2, to temperatures of 80–300° C., preferably to 80–130° C., optionally in the presence of solvents and/or diluents, such as chlorinated hydrocarbons, for example, chlorobenzene, dichlorobenzene, trichlorobenzene; chlorotoluenes, chloronaphthalenes and, when carboxylic carboxylic acid and/or sulphonic acid halides are used, preferably either with the addition of at least equivalent amounts of organic bases, such as pyridine or quinoline, or in these bases, When the free carboxylic acids are used, higher temperatures are required. An addition of condensing agents has proved to be advantageous, such as zinc or cadmium salts, for example, zinc chloride, zinc acetate, zinc bromide as well as the corresponding cadmium salts, but also sulphuric acid, phosphoric acid or polyhphosphoric acid. In some cases the reaction of carboxylic acid and/or sulphonic acid halides with VII succeeds in an aqueous medium in the presence of organic or inorganic bases.

As used herein the term lower as in lower alkyl or lower alkoxy refers to a carbon atom content of one to eight.

The new red to violet dystuffs of the present invention are valuable pigment dyestuffs. According to the processes described above, they are obtained in a high yield and generally in crystalline form. They are distinguished by a good resistance to heat, fastness to solvents, fastness to migration, fastness to lacquer top finishes, and light fastness, as well as by a high tinctorial strength, clearness and brilliancy of the color shades. They are therefore suitable, optionally after the conversion into a finely divided form, for the colouring of lacquers, synthetic materials as well as for the production of printing inks and pigment pastes, but also, for example, for the coloring of synthetic fibers in the spinning solution.

Parts and percentages given in the following examples are parts by weight, unless otherwise specified.

EXAMPLE 1

10 parts of perylene-3,4,9,10-tetracarboxylic dianhydride and 11.4 parts phenylhydrazine-4-sulphonic acid amide hydrochloride are stirred at 200° C. for 4 hours in 60 parts quinoline. After cooling, the mixture is filtered off with suction, the filter residue boiled out with water, filtered off with suction while hot, after-washed with ethanol and dried. A brilliant red dyestuff is obtained.

10 parts of the dyestuff thus obtained which are finely divided by grinding in a ball mill with 120 parts sodium chloride and washing out the common salt component, are ground in an automatic Hoover-Muller grinding machine with a stoving lacquer of 25 parts coconut oil alkyd resin (40% coconut oil), 10 parts melamine resin, 5 parts toluene and 7 parts glycol-monomethyl ether. The mixture is applied to the substrate to be lacquered, the lacquer is hardened by stoving at 130° C., and a brilliant red lacquering with very good fastness to light, to top finishes and resistance to weather is obtained.

EXAMPLE 2

10 parts of perylene-3,4,9,10-tetracarboxylic dianhydride and 8.6 parts 2-nitro-phenylhydrazine are stirred at 180° C. for 4 hours in 50 parts quinoline. After cooling, the mixture is filtered off with suction, the filter residue is boiled out with ethanol, filtered off with suction while hot and dried. A red dyestuff is obtained.

A mixture of 65 parts polyvinyl chloride, 35 parts diisooctyl phthalate, 2 parts dibutyl tin mercaptide, 0.5 part titanium dioxide and 0.5 part of the above dyestuff which was finely divided by grinding with sodium chloride, is colored at 165° C. on a mixing rolling mill. A red-colored mass is obtained which may serve for the production of foils and shaped articles. The colorings are distinguished by a high fastness to light and migration.

EXAMPLE 3

10 parts of perylene-3,4,9,10-tetracarboxylic dianhydride and 8.3 parts 2-hydrazino-benzimidazole are stirred at 160° C. for 4 hours in 50 parts quinoline. After cooling, the mixture is filtered off with suction, the filter residue is boiled out with ethanol, filtered off with suction while hot and dried. A red dyestuff is obtained which, when incorporated into synthetic materials, yields colorings with high fastness to migration and to light.

EXAMPLE 4

10 parts of perylene-3,4,9,10-tetracarboxylic dianhydride and 9.2 parts 2-hydrazino-benzothiazole are stirred at 200° C. for 4 hours in 50 parts quinoline. After cooling, the mixture is filtered off with suction, the filter residue boiled out with ethanol, filtered off with suction while hot and dried. A red dyestuff is obtained which imparts colorings of very good fastness to top finishes and light to organic lacquers.

EXAMPLE 5

10 parts of perylene-3,4,9,10-tetracarboxylic dianhydride and 9 parts 2-hydrazino-quinoxaline are stirred at 220° C. for 4 hours in 50 parts quinoline. After cooling, the mixture is filtered off with suction, the filter residue boiled out with ethanol, filtered off with suction while hot and dried. A red dyestuff with good fastness properties is obtained.

EXAMPLE 6

10 parts of perylene-3,4,9,10-tetracarboxylic dianhydried and 8.3 parts 3-hydroazino-sulpholan are stirred at 180° C. for 4 hours in 50 parts quinoline. After cooling, the mixture is filtered off with suction, the filter residue boiled out with ethanol, filtered off with suction while hot and dried. A red dyestuff with good fastness properties is obtained.

EXAMPLE 7

10 parts of perylene-3,4,9,10-tetracarboxylic dianhydride and 4.3 parts 2-hydrazino-ethanol are stirred at 200° C. for 4 hours in 50 parts quinoline. After cooling, the mixture is filtered off with suction, the filter residue boiled out with ethanol, filtered off with suction while hot and dried. A violet-tinted red dyestuff is obtained in a good yield and with good fastness properties.

EXAMPLE 8

10 parts perylene-3,4,9,10-tetracarboxylic dianhydride and 5.8 parts hydrazine-carboxylic acid ethyl ester are stirred at 180° C. for 5 hours in 50 parts quinoline. After cooling, the mixture is filtered off with suction, the filter residue boiled out with ethanol, filtered off with suction while hot and dried. A violet-tinted red dyestuff is obtained in good yield and with good fastness properties.

If, instead of the hydrazino-carboxylic acid ethyl ester, the hydrazines are used mentioned in the following, then red pigment dyestuffs are also obtained with good fastness properties at reaction temperatures of 160–200° C. and reaction times of 3–4 hours. The numbers in brackets indicate the parts by weight of the hydrazine derivatives which were reacted with 10 parts by weight perylene-3,4,9,10-tetracarboxylic anhydride.

2-chloro-phenylhydrazine (8),
3-chloro-phenylhydrazine (8),
4-chloro-phenylhydrazine (8),
2,4-dichloro-phenylhydrazine (10),
2,5-dichloro-phenylhydrazine (10),
2,6-dichloro-phenylhydrazine (10),
2,4-dinitro-phenylhydrazine (11.1), o-tolylhydrazine (6.9),
m-tolylhydrazine (6.9),
p-tolylhydrazine (6.9),
4-methoxy-phenylhydrazine (7.8),
3-hydrazino-benzene-sulphonic acid amide (11.4),
4-hydrazino-benzoic acid amide (8.4),
1-hydrazino-anthraquinone (13.2),
2-hydrazino-benzimidazole (8.3),
2-hydrazino-benzoxazole (8.3),
2-hydrazino-benzothiazole (9.3),
2-hydrazinopyridine (6.1),
2-hydrazino-4-methylquinoline (8.4).

EXAMPLE 9

10 parts perylene-3,4,9,10-tetracarboxylic dianhydride and 6.1 parts 2-hydrazino-pyrimidine are stirred at 210° C. for 4 hours in 75 parts trichlorobenzene. After cooling, the mixture is filtered off with suction, the filter residue boiled out with ethanol, filtered off with suction while hot and dried. A red dyestuff of outstanding fastness to light and very good fastness to top finishes and migration is obtained.

EXAMPLE 10

10 parts perylene-3,4,9,10-tetracarboxylic dianhydride and 7.8 parts salicylic acid hydrazide are stirred at 220° C. for 4 hours in 50 parts quinoline with the addition of 0.2 part zinc chloride. After cooling, the mixture is filtered off with suction, the filter residue boiled out with water, filtered off with suction while hot, after-washed with ethanol and dried. 16 parts of a pale bluish-red dyestuff are obtaned. A mixture of 65 parts polyvinyl chloride, 35 parts diisooctyl phthalate, 2 parts dibutyl-tin-mercaptide, 0.5 part titanium dioxide and 0.5 part of the above pigment, which was converted into a finely divided form by grinding with sodium chloride, is colored at 165° C. in a mixing rolling mill. A red-colored mass is obtained which can be used for the production of foils or shaped articles. The coloring is distinguished by high light and migration fastness.

EXAMPLE 11

10 parts 3,4,9,10-tetracarboxylic dianhydride and 8.5 parts 4-methoxy-benzoic acid hydrazide are stirred at 220° C. for 4 hours in 50 parts quinoline with the addition of 0.2 part zinc chloride. After cooling, the mixture is filtered off with suction, the filter residue is boiled out with water, filtered off with suction while hot and after-washed with ethanol and dried. A red dyestuff of very great tinctorial strength is obtained. 10 parts of the dyestuff, which was converted into a finely divided form by grinding in a ball mill with 120 parts sodium chloride and washing out the common salt, are ground in an automatic Hoover-Muller grinding machine with a stoving lacquer of 25 parts coconut oil alkyd resin (40% coconut oil), 10 parts melamine resin, 5 parts toluene and 7 parts glycol monomethyl ether. The mixture is applied to the substrate to be lacquered, the lacquer is hardened by stoving at 130° C., and a brilliant red lacquering of very good fastness to top finihes, to light and weather is obtained.

EXAMPLE 12

10 parts perylene-3,4,9,10-tetracarboxylic dianhydride and 12.5 parts benzilic acid hydrazide are stirred at 220° C. for 4 hours in 60 parts quinoline with the addition of 0.2 part zinc chloride. After cooling, the mixture is filtered off with suction, the filter residue boiled out with water, filtered off with suction while hot, after-washed with ethanol and dried. A red dyestuff of good fastness properties is obtained.

*Analysis.*—Calculated for $C_{52}H_{32}H_4O_8$ (840) (percent): C, 74.11; H, 3.83; N, 6.65. Found (percent): C, 73.5; H, 3.8; N, 6.8.

EXAMPLE 13

10 parts perylene-3,4,9,10-tetracarboxylic dianhydride and 8.5 parts 2-hydroxy-3-methyl-benzoic acid-hydrazide are stirred at 190–200° C. for 4 hours in a mixture of 75 parts trichlorobenzene and 6.6 parts quinoline with the addition of 0.2 part zinc chloride. After cooling, the mixture is filtered off with suction, the filter residue boiled out with water, filtered off with suction while hot, afterwashed with ethanol and dried. A red dyestuff with good fastness properties is obtained in a good yield.

EXAMPLE 14

10 parts perylene-3,4,9,10-tetracarboxylic dianhydride and 7 parts benzoic acid hydrazide are stirred at 220° C. for 4 hours in 50 parts quinoline with the addition of 0.2 part zinc chloride. After cooling, the mixture is filtered off with suction, the filter residue boiled out with water, filtered off with suction while hot, after washed with ethanol and dried. 15 parts of a brilliant red dyestuff with good fastness properties are obtained.

EXAMPLE 15

10 parts perylene-3,4,9,10-tetracarboxylic dianhydride and 11 parts dodecanoic acid hydrazide are stirred at 220° C. for 3 hours in 60 parts quinoline with the addition of 0.2 part zinc chloride. After cooling, the mixture is filtered off with suction, the filter residue boiled out with water, filtered off with suction while hot, after-washed with ethanol and dried. 19 parts of an intensive red dyestuff of a very soft grain are obtained.

EXAMPLE 16

10 parts perylene-3,4,9,10-tetracarboxylic dianhydride and 10.4 parts 3-hydroxy-naphthalene-carboxylic acid-2-hydrazide are stirred at 220° C. for 5 hours in 60 parts quinoline with the addition of 0.2 part zinc chloride. After cooling, the mixture is filtered off with suction, the filter residue boiled out with water, filtered off with suction while hot, after-washed with ethanol and dried. A red dyestuff is obtained in a good yield which, when incorporated in organic lacquers, exhibits very good fastness to top finishes at 130° C. and at 170° C.

EXAMPLE 17

10 parts perylene-3,4,9,10-tetracarboxylic dianhydride and 10.5 parts of 3-hydroxy-5,6,7,8-tetrahydronaphthalene-carboxylic acid-2-hydrazide are stirred at 220° C. for 5 hours in 50 parts quinoline with the addition of 0.2 part zinc chloride. After cooling, the mixture is filtered off with suction, the filter residue boiled out with water, filtered off with suction while hot, after-washed with ethanol and dried. A red dyestuff with good fastness properties is obtained.

EXAMPLE 18

10 parts perylene-3,4,9,10-tetracarboxylic dianhydride and 12 parts 2,4-dichloro-phenoxy-acetic acid hydrazide are stirred at boiling temperature for 5 hours while stirirng with the addition of 0.2 part zinc chloride. After cooling, the mixture is filtered off with suction, the filter residue boiled out with water, filtered off with suction while hot, after-washed with ethanol and dried. A red dyestuff with good fastness properties is obtained in a good yield.

EXAMPLE 19

10 parts perylene-3,4,9,10-tetracarboxylic dianhydride and 15 parts 1-phenyl-pyrazolone-(5)-carboxylic acid-(3)-hydrazide are stirred at 190–200° C. for 2 hours in 70 parts quinoline. After cooling, the mixture is filtered off with suction, the filter residue boiled out with water, filtered off with suction while hot, after-washed with ethanol and dried. A violet-tinted red dyestuff with good fastness properties is obtained.

EXAMPLE 20

10 parts perylene-3,4,9,10-tetracarboxylic dianhydride and a mixture of 3.9 parts salicylic acid hydrazide and 4.3 parts 4-methoxy-benzoic acid hydrazide are stirred at 220° C. for 4 hours in 50 parts quinoline with the addition of 0.2 part zinc chloride. After cooling, the mixture is filtered off with suction, the filter residue boiled out with water, filtered off with suction while hot, after-washed with ethanol and dried. A red dyestuff with good fastness properties is obtained.

EXAMPLE 21

10 parts perylene-3,4,9,10-tetracarboxylic dianhydride and a mixture of 4.3 parts 2-hydroxy-3-methyl-benzoic acid-hydrazide and 5.3 parts 2,5-dichloro-benzoic acid hydrazide are stirred at 220° C. for 4 hours in 50 parts quinoline with the addition of 0.2 part zinc chloride. After cooling, the mixture is filtered off with suction, the filter residue boiled out with water, filtered off with suction while hot, after-washed with ethanol and dried. A red dyestuff is obtained which, when incorporated into organic lacquers, exhibits a very good tinctorial strength and fastness to top finishes.

When, instead of the above hydrazides, there are used the hydrazides set out in the following (the numbers in parentheses indicate the amounts as parts by weight which were reacted with 10 parts perylene-3,4,9,10-tetracarboxylic anhydride) there are also obtained, at reaction temperatures of 190–220° C. and reaction times of 3–4 hours, red dyestuffs with good fastness properties:

tetradecanoic acid hydrazide (12.4),
hexadecanoic acid hydrazide (13.8),
octadecanoic acid hydrazide (15.3),
DL-lactic acid hydrazide (5.4),
2,4,5-trichloro-phenoxy-acetic acid hydrazide (13.8),
4,6-dichloro-3-methyl-phenylmercapto-acetic acid hydrazide (13.6),
benzoic acid-hydrazide (7),
2-chloro-benzoic acid-hydrazide (8.7),
3-chloro-benzoic acid-hyrazide (8.7),
4-chloro-benzoic acid-hydrazide (8.7),
2,4-dichloro-benzoic acid-hydrazide (10.5),
2,5-dichlorobenzoic acid-hydrazide (10.5),
3,4-dichloro-benzoic acid-hydrazide (10.5),
3-nitro-benzoic acid-hydrazide (9.3),
2-chloro-4-nitro-benzoic acid-hydrazide (11),
3,5-dinitrobenzoic acid-hydrazide (11.6),
2-methyl-benzoic acid-hydrazide (7.7),
3-methyl-benzoic acid-hydrazide (7.7),
4-methyl-benzoic acid-hydrazide (7.7),
biphenyl-carboxylic acid-4-hydrazide (10.9),
2-methoxy-benzoic acid-hydrazide (8.5),
5-chloro-2-hydroxy-benzoic acid-hydrazide (9.5),
3,5-dinitro-2-hydroxy-benzoic acid-hydrazide (12.4),
3-hydroxy-benzoic acid-hydrazide (7.8),
3-methoxy-benzoic acid-hydrazide (8.5),
4-hydroxy-benzoic acid-hydrazide (7.8),
3-chloro-4-hydroxy-benzoic acid-hydrazide (9.5),
DL-mandelic acid-hydrazide (8.5),
5-chloro-2-hydroxy-3-methyl-benzoic acid-hydrazide (10.2),
3-methyl-benzoic acid-hydrazide (10.2),
6-hydroxy-2,4-dimethyl-benzoic acid-hydrazide (9.2),
2-hydroxy-5-sulphonamido-beznoic acid-hydrazide (11.8),
2-hydroxy-naphthalene-carboxylic acid-1-hydrazide (10.4),
3-hydroxy-7-sulphonamido-naphthoic acid-2-hydrazide (14.4),
2,4-dihydroxy-benzoic acid-hydrazide (8.6),
gallic acid-hydrazide (9.4),
4-sulphonamido-benzoic acid-hydrazide (11),
4-N, N-dimethyl-sulphonamido-benzoic acid-hydrazide (12.5),
isonicotinic acid-hydrazide (7).

EXAMPLE 22

10 parts perylene-3,4,9,10-tetracarboxylic dianhydride and 9.7 parts benzene-sulphonic acid hydrazide are stirred at 150° C. for 5 hours in 50 parts quinoline. After cooling, the mixture is filtered off with suction, the filter residue boiled out with ethanol, filtered off with suction while hot and dried. 15.9 parts of a red dyestuff are obtained which, when incorporated into organic lacquers, shows very good fastness to top finishes and a very good fastness to migration.

EXAMPLE 23

10 parts perylene-3,4,9,10-tetracarboxylic dianhydride and 13.5 parts 3,4-dichloro-benzene-sulphonic acid hydrazide are stirred at 150° C. for 3 hours in 60 parts quinoline. After cooling, the mixture is filtered off with suction, the filter residue boiled out with ethanol, filtered off with suction while hot and dried. A red dyestuff with good fastness properties is obtained.

EXAMPLE 24

10 parts perylene-3,4,9,10-tetracarboxylic dianhydride and 12.9 parts 4-acetylamino-benzene-sulphonic acid hydrazide are stirred at 150° C. for 3 hours in 60 parts quinoline. After cooling, the mixture is filtered off with suction, the filter residue boiled out with ethanol, filtered off with suction while hot and dried. A red dyestuff with good fastness properties is obtained.

EXAMPLE 25

10 parts perylene-3,4,9,10-tetracarboxylic dianhydride and 15 parts benzene - 1 - carboxylic acid - (2' - chloroanilide)-4-carboxylic acid hydrazide are stirred at 220° C. for 4 hours in 50 parts quinoline after the addition of 0.2 part zinc chloride. After cooling, the mixture is filtered off with suction, the filter residue boiled out with water, filtered off with suction while hot, after-washed with ethanol and dried. A red dyestuff is obtained in a good yield with good fastness properties.

When, instead of the above-mentioned hydrazides, the following are used, red dyestuffs with good general fastness properties are also obtained:

benzene-1-carboxylic acid-(3'-chloro-anilide)-4-carboxylic acid hydrazide,
benzene-1-carboxylic acid-(4'-chloro-anilide)-4-carboxylic acid hydrazide,
benzene-1-carboxylic acid-(2',4'-dichloro-anilide)-4-carboxylic acid hydrazide,
benzene-1-carboxylic acid-(3',4'-dichloro-anilide)-4-carboxylic acid hydrazide,
benzene-1-carboxylic acid-(2',5'-dichloro-anilide)-4-carboxylic acid hydrazide,
benzene-1-carboxylic acid-(2'-methoxy-anilide)-4-carboxylic acid hydrazide,
benzene-1-carboxylic acid-(3'-methoxy-anilide)-4-carboxylic acid hydrazide,
benzene-1-carboxylic acid-(4'-methoxy-anilide)-4-carboxylic acid hydrazide,
benzene-1-carboxylic acid-(2'-methoxy-5-chloro-anilide)-4-carboxylic acid hydrazide.

EXAMPLE 26

When the process is carried out as described in Example 25 but, instead of the terephthalic acid semiamide-hydrazides, the corresponding amounts of semiamide-hydrazides of isophthalic acid are used, bluish red pigment dyestuffs with very good resistance to top finishes, migration and light fastness are also obtained.

benzene-1-carboxylic acid-(2'-chloro-anilide)-3-carboxylic acid hydrazide,
benzene-1-carboxylic acid-(3'-chloro-anilide)-3-carboxylic acid hydrazide,
benzene-1-carboxylic acid-(4'-chloro-anilide)-3-carboxylic acid hydrazide, benzene-1-carboxylic acid-(2',4'-dichloro-anilide)-3-carboxylic acid hydrazide,
benzene-1-carboxylic acid-(3'-4'-dichloro-anilide)-3-carboxylic acid hydrazide,
benzene-1-carboxylic acid-(2',5'-dichloro-anilide)-3-carboxylic acid hydrazide.
benzene-1-carboxylic acid-(4'-methoxy-anilide)-3-carboxylic acid hydrazide,
benzene-1-carboxylic acid-(2'-methoxy-5'-chloro-anilide)-3-carboxylic acid hydrazide.

Pigment dystuffs with outstanding fastness properties are also obtained according to the process of Example 25 with the use of 1 mol perylene-tetracarboxylic dianhydride and 2 mols 4-(2'-chloro-benzoyl)-amino-benzoic acid hydrazide of the formula:

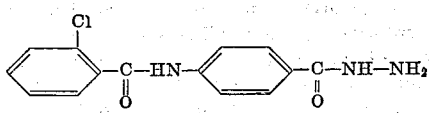

When the following acylamino-benzoic acid hydrazides are used, bluish red pigment dyestuffs with very good fastness to top finishes, migration and light are also obtained:

4-(3'-chloro-benzoyl)-amino-benzoic acid hydrazide,
4-(4'-chloro-benzoyl)-amino-benzoic acid hydrazide,
4-stearylamino-benzoic acid hydrazide,
3-(2'-chloro-benzoyl)-amino-benzoic acid hydrazide,
3-(4'-chloro-benzoyl)-amino-benzoic acid hydrazide,
3-(4'-methoxy-benzoyl)-amino-benzoic acid hydrazide,
2-(2'-chloro-benzoyl)-amino-benzoic acid hydrazide,
2-(3',4'-dichloro-benzoyl)-amino-benzoic acid hydrazide.

There is used in each case ½ mol acylamino-benzoic acid hydrazide for 1 mol perylene-tetracarboxylic dianhydride.

EXAMPLE 27

10 parts N,N'-perylene-3,4,9,10-tetracarboxylic acid-diamino-diimide are suspended in 100 parts chlorobenzene, mixed, while stirring, with 8.4 parts 2-chloro-benzoylchloride and 3.8 parts pyridine and the suspension is heated under reflux to boiling for 2 hours. The mixture is then filtered off with suction, the filter residue washed with ethanol and dried. There are obtained 16.1 parts of a red pigment dyestuff which has excellent fastness to top finishes and to light. The same dyestuff is also obtained without the addition of pyridine.

EXAMPLE 28

10 parts N,N'-perylene-3,4,9,10-tetracarboxylic acid-diamino-diimide are suspended in 100 parts quinoline, 8.4 parts 3-chloro-benzoylchloride are admixed while stirring, and the mixture is heated at 220° C. for 2 hours. It is then filtered off with suction, the filter residue washed with ethanol and dried. A red dyestuff is obtained in a high yield and with excellent fastness to top finishes and to light.

EXAMPLE 29

10 parts 4-chloro-benzoic acid are suspended in 100 parts chlorobenzene, 7.7 parts thionylchloride are admixed and the suspension heated to boiling under reflux for 1 hour. 13.5 parts N,N'-perylene-3,4,9,10-tetracarboxylic acid-diamino-diimide and 5.1 parts pyridine are then added and the mixture is heated to boiling under reflux for 2 hours. The precipitated dyestuff is filtered off with suction, washed with ethanol and dried. A bluish red pigment dyestuff is obtained in a very good yield.

EXAMPLE 30

10 parts 2,5-dichloro-benzoic acid and 11 parts N,N'-perylene-3,4,9,10-tetracarboxylic acid-diamino-diimide are heated at 240° C. for 5 hours, while stirring, in 100 parts quinoline with the addition of 2 parts zinc chloride. The resultant dyestuff is filtered off with suction, boiled out with water, again filtered off with suction, washed with ethanol and dried. A bluish red dyestuff is obtained.

EXAMPLE 31

10 parts 2,4-dichloro-benzoic acid ethyl ester and 9.6 parts N,N'-perylene-3,4,9,10-tetracarboxylic acid-diamino-diimide are heated at 240° C. for 5 hours, while stirring, in 100 parts quinoline with the addition of 2 parts zinc chloride. The resultant dyestuff is filtered off with suction, boiled out with water, again filtered off with suction, washed with ethanol and dried. A red pigment dyestuff is obtained in a good yield.

If, instead of the above-mentioned carboxylic acid, carboxylic acid chlorides or carboxylic acid esters, there are used the carboxylic acid chlorides or carboxylic acid esters of the carboxylic acids listed below or these themselves, then there are also obtained, under the conditions given in Examples 10 to 14, with the use of N,N'-perylene-3,4,9,10-tetracarboxylic acid-diamino-diimide, red dyestuffs with good fastness properties;

dodecanoic acid,
tetradecanoic acid,
hexadecanoic acid,
octadecanoic acid,
DL-lactic acid,
2,4,5-trichloro-phenoxyacetic acid,
4,6-dichloro-3-methyl-phenylmercapto acetic acid,
3,4-dichloro-benzoic acid,
salicylic acid,
3-hydroxy-benzoic acid,
4-hydroxy-benzoic acid,
salicylic acid-methyl ether,
3-methoxy-benzoic acid,
4-methoxy-benzoic acid,
3-nitro-benzoic acid,
2-chloro-4-nitro-benzoic acid,
3,5-dinitro-benzoic acid,
2-methyl-benzoic acid,
3-methyl-benzoic acid,
4-methyl-benzoic acid,
biphenyl-carboxylic acid-4,
5-chloro-2-hydroxy-benzoic acid,
3-chloro-4-hydroxy-benzoic acid,
4-chloro-3-hydroxy-benzoic acid,
3,5-dinitro-2-hydroxy-benzoic acid,
DL-mandelic acid,
5-chloro-2-hydroxy-3-methyl-benzoic acid,
6-hydroxy-2,4-dimethyl-benzoic acid,
2-hydroxy-5-sulphonamido-benzoic acid,
2-hydroxy-naphthalene-carboxylic acid-1,
3-hydroxy-7-sulphonamido-naphthoic acid-2,
2,4-dihydroxy-benzoic acid,
gallic acid,
4-sulphonamido-benzoic acid,
4-N,N-dimethylsulphonamido-benzoic acid,
isonicotinic acid,
2,3-dihydroxyquinoxaline-carboxylic acid-6,
2-hydroxy-3-methyl-benzoic acid,
3-hydroxy-naphthalene-carboxylic acid-2,
cyclohexane-carboxylic acid,
1-phenyl-pyrazolone-5-carboxylic acid-3.

EXAMPLE 32

10 parts N,N'-perylene-3,4,9,10-tetracarboxylic acid-diamino-diimide in 100 parts chlorobenzene are mixed, while stirring, with 8.4 parts benzene-sulphonic acid chloride and 3.8 parts pyridine. The mixture is then heated at 100° C. for 2 hours, the precipitated dyestuff filtered off with suction, washed with ethanol and dried. A red dyestuff is obtained in a good yield.

EXAMPLE 33

10 parts N,N'-perylene-3,4,9,10-tetracarboxylic acid-diamino-diimide in 100 parts quinoline are mixed, while stirring, with 10.1 parts 4-chloro-benzene-sulphonic acid chloride and the mixture is heated at 150° C. for 2 hours. It is then filtered off with suction, the filter residue washed with ethanol and dried. A red dyestuff is obtained.

With the use of N,N'-perylene-3,4,9,10-tetracarboxylic acid-diamino-diimide, there are also obtained under the conditions given in Examples 15 and 16 red pigment dyestuffs with good fastness properties with the following sulphonic acid chlorides:

2-methyl-benzene-sulphonic acid chloride, 4-methyl benzene sulphonic acid chloride, 3,4-dichloro-benzene-sulphonic acid chloride, 4-acetylamino-benzene-sulphonic acid chloride, and 8-chloro-naphthalene-sulphonic acid chloride.

EXAMPLE 34

10 parts perylene-3,4,9,10-tetracarboxylic dianhydride and 6.3 parts semicarbazide hydrochloride are stirred at 170° C. for 4 hours in 60 parts quinoline. After cooling, the mixture is filtered off with suction, the filter residue boiled out with ethanol, filtered off with suction while hot and dried. 12 parts of a violet-tinted red dyestuff are obtained.

A mixture of 65 parts polyvinyl chloride, 35 parts diisooctyl phthalate, 2 parts dibutyl-tin-mercaptide, 0.5 part titanium dioxide and 0.5 part of the above pigment which was converted into a finely divided form by grinding with sodium chloride, is colored at 165° C. in a mixing rolling mill. A blue-red colored mass is obtained which can be used for the production of foils or shaped articles. The coloring is distinguished by a high fastness to light and migration.

EXAMPLE 35

10 parts perylene-tetracarboxylic dianhydride and 77 parts aminoguanidine hydrogen carbonate are stirred at 190° C. for 4 hours in 100 parts trichlorobenzene. After cooling, the mixture is filtered off with suction, the filter residue boiled out with ethanol, filtered off with suction while hot and dried. A violet dyestuff is obtained in good yield which, when incorporated into organic lacquers, shows very good fastness to top finishes at 130° C. and at 170° C. and very good light fastness.

EXAMPLE 36

10 parts perylene-tetracarboxylic dianhydride and 5.1 parts thiosemicarbazide are stirred at 150° C. for 2 hours in 50 parts quinoline. After cooling, the mixture is filtered off with suction, the filter residue boiled out with ethanol, filtered off with suction while hot and dried. A violet-tinted red dyestuff is obtained in good yield.

Although the invention has been described in considerable detail with reference to certain preferred embodiments thereof, it will be understood that variations and modifications can be effected within the spirit and scope of the invention as described hereinabove and as defined in the appended claims.

What is claimed is:
1. The dyestuff of the formula

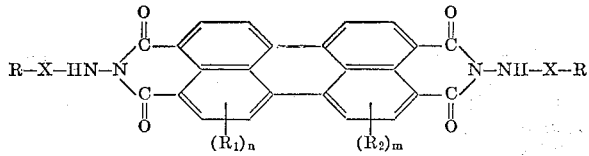

in which X is —CO— or —SO$_2$—; R is unsubstituted alkyl with 1–20 carbon atoms; alkyl with 1–20 carbon atoms mono-substituted with a member selected from the group consisting of fluorine, chlorine, bromine, nitro, hydroxy, alkoxy with 1–4 carbon atoms, phenyloxy, phenyloxy mono-, di- or tri-substituted with chlorine or mono-substituted with bromine, fluorine or nitro, naphthyloxy, naphthyloxy mono-substituted with fluorine, chlorine, bromine or nitro, alkylmercapto with 1–4 carbon atoms, phenyl-mercapto, phenylmercapto mono-substitute with fluorine, chlorine, bromine or alkyl with 1–4 carbon atoms, naphthylmercapto, naphthylmercapto mono-substituted with fluorine, chlorine, bromine or alkyl with 1–4 carbon atoms, alkanoyloxy having 1–4 carbon atoms, alkylcarbonylamino with 1–4 carbon atoms in the alkyl group, benzoylamino, alkylsulfonylamino with 1–4 carbon atoms, phenylsulfonylamino, toluene sulfonylamino, carboxamido, sulfonamido, phenyl and phenyl mono-substituted with fluorine, chlorine, bromine, hydroxyl or alkyl of 1–4 carbon atoms; cyclohexyl; cyclopentyl; phenyl; phenyl mono-substituted with nitro, phenyl or nitrophenyl; phenyl mono-, di- or tri-substituted with fluorine, chlorine, bromine, alkyl with 1–4 carbon atoms, hydroxyl, alkoxy with 1–4 carbon atoms, ethylthio, stearylamino, alkylcarbonyloxy with 1–4 carbon atoms in the alkyl group, phenyloxy-carbonyl, sulfonamido, carboxamido, phenylcarbonylamino, phenylcarbonylamino mono-substituted with chlorine or methoxy; naphthyl; naphthyl mono-substituted with fluorine, chlorine, bromine, nitro, alkyl with 1–4 carbon atoms, phenyl, nitrophenyl, hydroxyl, alkoxy with 1–4 carbon atoms, alkylcarbonyloxy with 1–4 carbon atoms in the alkyl group, phenyloxy-carbonyl, sulfonamido or carboxamido; 5,6,7,8-tetrahydronaphthyl mono-substituted with hydroxyl; anthryl; anthryl-(2) mono-substituted with hydroxyl; anthraquinonyl-(2); anthraquinonyl-(2) mono-substituted with chlorine or nitro; diphenyleneoxide-yl-(2) monosubstituted with hydroxyl; pyridinyl-(3); pyridinyl-(4); pyrazinyl-(2); quinoxalin-yl-(2); carbazolyl-(3) mono-substituted with hydroxy; 11-H benzocarbazolyl-(3) mono-substituted with hydroxy; or pyrazolone-(5)-yl-(3) mono-substituted with phenyl or with nitro-phenyl; R$_1$ and R$_2$ are H, chlorine, or methoxy, $n$ and $m$ are the integers 1 to 4.

2. The dyestuff of claim 1 having the formula

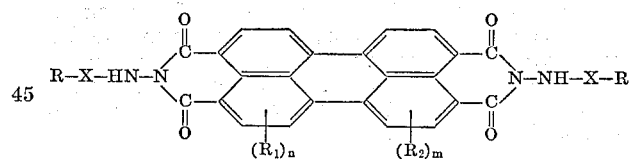

in which X is —CO— or —SO$_2$—; R is alkyl with 1–20 carbon atoms; alkyl with 1–20 carbon atoms mono-substituted with a member selected from the group consisting of hydroxy, acetylamino, phenoxy, phenoxy mono-, di- or tri-substituted with chlorine or mono-substituted with nitro, naphthyloxy mono-substituted with acetylamino, phenylmercapto, phenylmercapto mono-substituted with chlorine or methyl, naphthylmercapto, naphthylmercapto mono-substituted with chlorine, phenyl and phenyl mono-substituted with hydroxy; cyclohexyl; phenyl; phenyl mono-substituted with nitro, phenyl or nitrophenyl; phenyl mono-, di- or tri-substituted with chlorine, bromine, methyl, hydroxyl, methoxy, acetyl, ethylthio or sulfonamido; naphthyl; naphthyl mono-substituted with hydroxyl; 5,6,7,8-tetrahydronaphthyl mono-substituted with hydroxyl; anthryl-(2) mono-substituted with hydroxyl; anthraquinonyl-(2); anthraquinonyl-(2) mono-substituted with chlorine or nitro; diphenyleneoxide-yl-(2) mono-substituted with hydroxyl; pyridinyl-(3); pyridinyl-(4); pyrazinyl-(2); quinoxalin-yl-(2); carbazolyl-(3) mono-substituted with hydroxy; 11H-benzocarbazolyl-(3) mono-substituted with hydroxy; or pyrazolone-(5)-yl-(3) mono-substituted with phenyl or with nitro-phenyl; R$_1$ and R$_2$ are H, chlorine, or methoxy; $n$ and $m$ are the integers 1 to 4.

3. The dyestuffs of claim 1 of the formula:

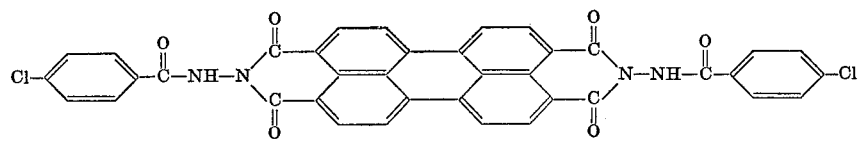

4. The dyestuff of claim 1 of the formula:

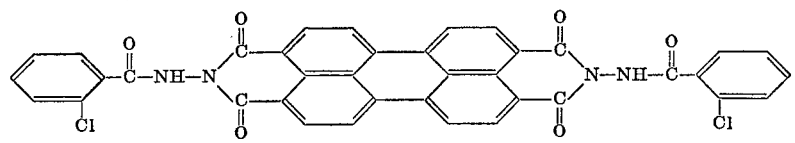

5. The dyestuff of claim 1 of the formula:

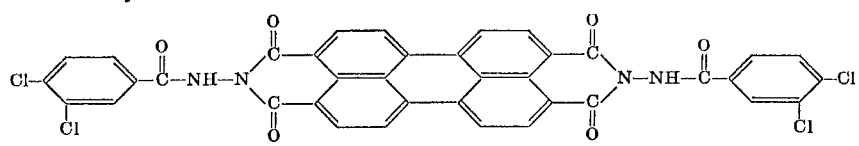

6. The dyestuff of claim 1 of the formula:

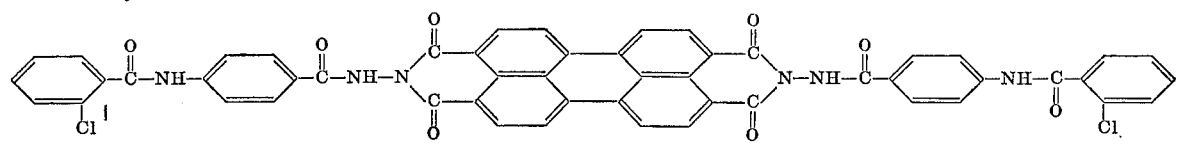

7. The dyestuffs of claim 1 of the formula

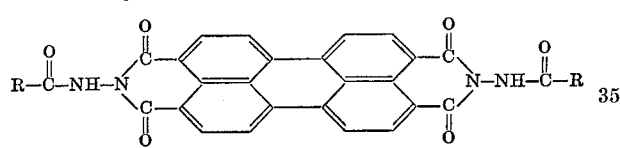

wherein R is lower alkyl, cyclohexyl, cyclopentyl, benzyl or phenyl.

References Cited

UNITED STATES PATENTS

| | | | |
|---|---|---|---|
| 1,935,945 | 11/1933 | Eckert et al. | 260—281 X |
| 2,192,828 | 3/1940 | Daniels | 260—239.8 X |
| 2,965,644 | 12/1960 | Eckert et al. | 260—282 |
| 3,346,568 | 10/1960 | Schmidt et al. | 260—239.8 |
| 3,357,983 | 12/1967 | Weener | 260—281 |
| 3,515,732 | 6/1970 | Staeuble et al. | 260—281 |
| 3,546,222 | 12/1970 | Irving | 260—249.6 |

FOREIGN PATENTS

| | | | |
|---|---|---|---|
| 894,859 | 4/1962 | Great Britain | 260—281 |
| 1,147,702 | 4/1963 | Germany | 260—281 |

DONALD G. DAUS, Primary Examiner

U.S. Cl. X.R.

8—55; 260—239.8, 249.5, 250 R, 288 R, 294.8 F, 296 R, 302 R, 307 D, 309.2, 310 A, 315, 326.5, 343.5, 377, 378, 505 R, 554, 556 H, 558 H, 569, 583 B